United States Patent [19]

Hartmann

[11] Patent Number: 5,537,468
[45] Date of Patent: Jul. 16, 1996

[54] METHOD FOR THE NON-HIERARCHICAL ROUTING OF TRAFFIC IN A COMMUNICATIONS NETWORK

[75] Inventor: Harro L. Hartmann, Brunswick, Germany

[73] Assignee: Siemens Aktiengesellschaft, Munich, Germany

[21] Appl. No.: 211,672

[22] PCT Filed: Oct. 6, 1992

[86] PCT No.: PCT/EP92/02302

§ 371 Date: Apr. 12, 1994

§ 102(e) Date: Apr. 12, 1994

[87] PCT Pub. No.: WO93/08666

PCT Pub. Date: Apr. 29, 1993

[30] Foreign Application Priority Data

Oct. 15, 1991 [DE] Germany .......................... 91117567.7

[51] Int. Cl.⁶ ................................................. H04M 7/00
[52] U.S. Cl. ............................. 379/221; 379/207; 370/16
[58] Field of Search ................................. 379/221, 279, 379/113, 112, 219, 220, 207, 201; 370/16

[56] References Cited

U.S. PATENT DOCUMENTS

| 4,284,852 | 8/1981  | Szybicki et al.  | 379/221 |
| 4,345,116 | 8/1982  | Ash et al.       | 379/221 |
| 4,669,113 | 5/1987  | Ash et al.       | 379/221 |
| 4,704,724 | 11/1987 | Krishnan et al.  | 379/221 |
| 4,788,721 | 11/1988 | Krishnan et al.  | 379/221 |
| 4,991,204 | 2/1991  | Yamamoto et al.  | 379/221 |
| 5,058,105 | 10/1991 | Mansour et al.   | 370/16  |
| 5,142,570 | 8/1992  | Chaudhary et al. | 379/221 |

FOREIGN PATENT DOCUMENTS

| 0376556    | 4/1990  | European Pat. Off. | H04Q 3/00 |
| 0449480    | 2/1991  | European Pat. Off. | H04Q 3/66 |
| WO90/01237 | 8/1990  | WIPO               | H04M 7/00 |
| WO91/20148 | 12/1991 | WIPO .             |           |

OTHER PUBLICATIONS

"Towards Dynamic Network Control", Richards et al, Proceedings of the National Communications Forum, Oct. 1985, Rosemont, IL, pp. 596–600.

"Dynamic Alternative Routing In the British Telecom Trunk Network", Stacey et al, International Switching Symposium, Mar. 1987, Phoenix, AZ, pp. 984–988.

"Use of A Trunk Status Map For Real–Time DNHR", G. R. Ash, AT&T Bell Laboratories, Holmdel, N.J., ITC–11, 1985, pp. 795–801.

*Primary Examiner*—Jeffery Hofsass
*Assistant Examiner*—Scott Wolinsky
*Attorney, Agent, or Firm*—Hill, Steadman & Simpson

[57] ABSTRACT

A non-hierarchical method for routing traffic to achieve optimum throughput values under all traffic load states by modifying the number of alternate routes available for overflow traffic in substantially real time, independent of the traffic load states of the alternate routes. First and second switching centers (V1, V2) are connected to a non-hierarchical communications network comprising a number of interconnected switching nodes (A, B, C, D, E, F) including at least one originating switching node (A) and at least one destination switching node (D) such that a number of connection paths exist between the originating and destination switching nodes (A, D). Originating switching node (A) comprises a routing process (RP), a routing table (RT) and a local trunk status map (LTSM) for determining an alternate route sequence (AWS).

5 Claims, 3 Drawing Sheets

METHOD FOR THE NON-HIERARCHICAL ROUTING OF TRAFFIC IN A COMMUNICATIONS NETWORK

BACKGROUND OF THE INVENTION

The invention relates to a method for the non-hierarchical routing of traffic in a communications network.

A prior art method is already known from the printed document ITC-11 (1985) pp. 795–801, "Use of a trunk status map for real-time DNHR" by G. R. Ash. The known method exhibits significant losses in throughput under overload.

A prior art method is also known from the U.S. Pat. No. 4,669,113.

U.S. Pat. No. 4,669,113 discloses an integrated network controller for a dynamic non-hierarchical routing switching network.

From the European document EP-A-0 449 480 (corresponding to U.S. Pat. No. 5,101,451), a decentralized and near-real-time routing method is also known in which only a single alternate route is always used.

From the European document EP-A-0 376 556 (corresponding to U.S. Pat. No. 5,101,451), a decentralized and near-real-time routing method is also known in which only a single alternate route is always used.

From the document "Dynamic alternative routing in the British Telecom trunk Network", Stacey et al., ISS 87, a decentralized and near-real-time routing method is also known in which only a single alternate route is always used. As soon as a call overflowing to this alternate route is blocked, another possible alternate route is selected in accordance with the principle of random selection which is then used, in turn, as the only alternate route for the overflow traffic.

All previously known dynamic methods for the non-hierarchical routing of traffic only achieve optimum throughput values under certain traffic loads, i.e. they exhibit significant losses in throughput either under overload or under high or rated load.

SUMMARY OF THE INVENTION

The invention is based on the problem of achieving optimum throughput values for all traffic loads. This problem is solved by a method of the present invention for the non-hierarchical routing of traffic in a communications network which comprises a number of switching nodes which are intermeshed with one another via links in such a manner that a number of connection paths exist between two such switching nodes. The traffic between two such switching nodes is directed via at least one planned route. The traffic is directed via alternate routes in accordance with an alternate route sequence when a connection via a planned route is not possible. The alternate-route sequence represents an order of alternate routes ordered in accordance with increasing traffic loading states and is periodically determined in near-real-time time intervals. The alternate-route sequence is determined in the respective originating switching node. The alternate-route sequence is determined from a predetermined set of alternate routes, an alternate route, the traffic load condition of which exceeds a certain threshold value, also not being included in the alternate-route sequence.

Due to the real-time status-controlled adaptation of the number and order of the alternate routes available for the traffic, i.e. the alternate-route sequence, almost optimum throughput values or minimum transport costs are achieved under all load conditions.

If all alternate routes of a traffic pair are overloaded, only the planned routes or the planned route are finally still available for the traffic.

Due to this state-controlled route selection, the heavy load specific to traffic pairs is reduced, on the one hand, but, at the same time, the background load (traffic over planned routes plus overflow from other network sections) on the affected link sections is favored. This increases the successful throughput of the entire communications network. The method for non-hierarchical routing of traffic according to the invention therefore operates conservatively with reserved access and compatibly with other routing environments. It utilizes the generally non-coincident traffic minima (multi-hour routing) in real time by knowing allocation of idle channels (multi-service routing).

The method according to the invention can be called state-controlled dynamic non-hierarchical routing, SDNHR in brief.

The method according to the invention has the advantage, in particular, that the traffic load on the signaling channels is reduced compared with a central routing method and thus the throughput is aided. This is of significance, particularly in a communications network having many switching nodes and a large number of alternate routes. For the rest, the processing load is distributed to the local processors. This makes it possible to achieve dependability-relevant routing methods with decentralized processing load sharing which are efficient in real time.

The traffic load condition of an alternate route is graded by means of the busy/idle state of the outgoing primary link of the alternate route from the originating switching node. This embodiment of the method according to the invention has the advantage, in particular, that the originating switching node can grade the traffic load condition of an alternate route in a simple manner.

The traffic load condition of an alternate route is graded by means of blocking experience with respect tot he successor links. This further embodiment of the method according to the invention has, in particular, the advantage that the originating switching node can grade the traffic loading state of an alternate route, taking into consideration the successor link loadings in a learning manner.

The traffic load condition of an alternate route is graded by means of the busy/idle state of all links forming the alternate route and the availability of the intermediate switching nodes located on the alternate route. This further embodiment of the method according to the invention has, in particular, the advantage that the originating switching node can grade the traffic loading state of an alternate route taking into consideration the states of the successor links without having to use a method for estimating the blocking probability of an alternate route.

The particular threshold value is modified link-specifically and in near-real-time in dependence on the difference, averaged over a prediction interval, between cal arrivals and call completions. This further embodiment of the method according to the invention has, in particular, the advantage that, in the overload case, the alternate route traffic (overflow traffic) is displaced even more in favor of the planned traffic.

BRIEF DESCRIPTION OF THE DRAWINGS

The features of the present invention which are believed to be novel, are set forth with particularity in the appended

DESCRIPTION OF THE PREFERRED EMBODIMENT

In the text which follows, a special embodiment of the method according to the invention is explained in greater detail with reference to the drawings.

Figure 1:
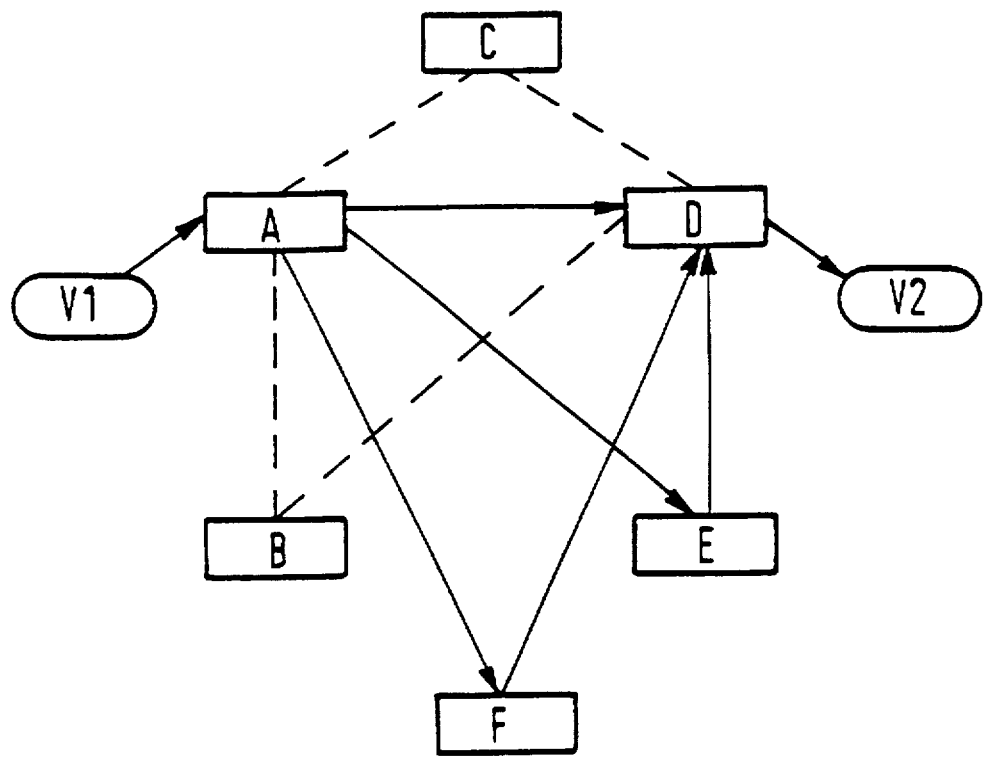
FIG. 1 shows a communications network in which the method according to the invention is used.

FIG. 1 shows a communications network which contains switching nodes A, B, C, D, E and F. Each of the switching nodes A to F shown operates with a route fan-out planned by the network operator or by a central network management, in which, apart from a planned route (a direct route if possible) or a number of planned routes, a centrally predetermined number M of alternate routes to each call destination or destination switching node is contained. In the case of a number of planned routes, the order of these planned routes is predetermined by central network engineering or network management. The number and order of alternate routes can also be predetermined by central network management, for example in 5-minute intervals, in extraordinary network situations. In the case of normal network situations and thus in dominant operating time intervals, however, the alternate routes are potential real-time routes. According to the invention, these alternate routes are allocated by the routing process in a decentralized manner and state-controlled to the calls received at a switching node in accordance with an alternate route sequence determined by the routing process in relatively small cycle times. FIG. 1 also shows a first switching center V1 which is connected to the non-hierarchical communications network via the switching node A and a second switching center V2 which is connected to the non-hierarchical communications network via switching node D. Since the connection of the two switching centers V1 and V2 is fixed or planned-hierarchical, a connection setup between the switching centers V1 and V2, shown in FIG. 1, takes place via switching nodes A and D of the non-hierarchical communications network. The calls of the switching center V1 received at the originating switching node A can be switched to the destination switching node D via alternate connection paths which is shown by solid connecting arrows in FIG. 1. The connection paths shown dashed in FIG. 1 between the originating switching node A and the destination switching node D are connection paths which were not selected by the routing process, i.e. they were not included in the alternate route sequence in the route updating interval under consideration.

Figure 2:
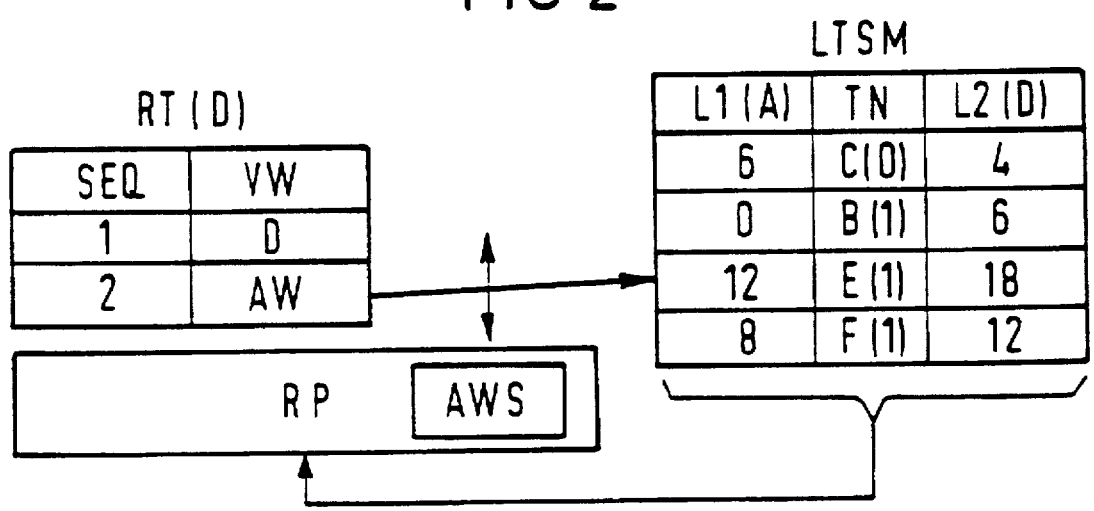
FIG. 2 shows the processing structure existing in a switching node for implementing the method according to the invention.

FIG. 2 shows the processing structure existing in the selected originating switching node A for implementing the method according to the invention. The implementation of the invention, explained in greater detail in the text which follows, generally contains software and hardware components having matched task allocations.

The processing structure shown in FIG. 2 comprises a routing process RP, a routing table RT (D) and a local trunk status map LTSM. The routing process RP is used for determining an alternate route sequence AWS within the centrally allowed set of M alternate routes. It uses the local trunk status map LTSM in which the states of the links of all alternate routes are stored and, if necessary, contains binary information on the availability of transit nodes TN of the alternate routes.

The routing table RT (D) contains a route sequence SEQ of connection paths VW by means of which the switching process is primarily provided with a planned direct route D and secondarily with a current alternate route AW in the present example. The current alternate route AW is provided to the switching process until it is occupied by overflow traffic or congestion occurs. This results in a message to the routing process RP whereupon the latter writes the next alternate route according to the alternate route sequence AWS as the new current alternate route instead of the previous current alternate route into the routing table.

The local trunk status map LTSM contains the states of all centrally allowed alternate routes of a respective pair of origin-destination switching nodes, in this case, for example, the switching node pair A–D. From this, the routing process determines the alternate route sequence within the route update interval, that is to say the order and the extent of the alternate routes used for the overflow traffic. All calls received in the in each case next route update interval utilize this alternate route sequence in the sequential overflow.

In the text which follows, the special pair of origin-destination switching nodes A–D will be considered.

As a first connection path, the planned route D which in this case is especially a direct route is predetermined. As a first alternate route AW, the routing process predetermines the least-loaded connection path via the switching node E. The switching node E is in this case a transit node TN which is available for the traffic. The availability of a transit node TN is expressed by a binary value in brackets behind the designation of the transit node in the local trunk status map. The first alternate route extends via a primary link L1 (A), which according to the local trunk status map exhibits 12 idle channels, and via a secondary link L2 (D) which exhibits 18 idle channels. For this reason, incoming multi-channel connection requests of up to 12 channels can also be offered to this alternate route.

The time interval after which the local trunk status map is updated with non-local status information (route update interval dT) is about 10 seconds. This ensures, on the one hand, a near-real-time recording of the busy/idle states of the alternate routes and, on the other hand, the resultant frequency of interrogation of the local trunk status map and thus the load of analyses is low.

The routing process ensures that the incoming calls are assigned to the alternate routes having the in each case greatest continuously available numbers of channels, i.e. having the lowest traffic loading. For this purpose, the following process components are required:

a) LTSM entries at the rate of the route update interval: available channels, minus trunk reservation, minus estimated BIAS values.

b) Allocation of the incoming calls to the most idle alternate route with overflow to lower-order alternate routes. The rank order follows decreasing continuously idle channel numbers.

c) Call blocking if no alternate route available.

If during the setting up of the connection, the secondary link of the first alternate route is blocked contrary to the information of the local trunk status map, crank-back occurs and the connection path via the transit switching node F is used as second alternate route. Other alternate routes are not available within the route update interval of the local trunk status map considered and can therefore not be used for setting up the connection. The connection path via the intermediate switching node B is not selected by the routing process because of a lack of idle channels on the primary link L1 (A) and the connection path via the intermediate switching node C is not selected because of overload in C, and thus not made available to the switching process. The routing process thus generates from a centrally predetermined set of M alternate routes a subset of alternate routes ordered in accordance with idle connection path capacities, where T is $\leq M$.

In the case of incoming multi-channel calls, the existing idle connection capacities are determining in the same rank order. The assignment of two H0 channels having in each case 384 kbit/s required capacity leads during the route update interval considered, for example, to the alternate route via the intermediate switching node E being booked out and thus to this alternate route being lowered in rank or discarded in the next updating interval.

The number of idle trunks of a link specified in the local trunk status map according to FIG. 2 is already reduced by a certain number of trunks. This artificial reduction takes into consideration, on the one hand, the usual link-specific trunk reservation for stabilizing the throughput of the network and, on the other hand, a BIAS-related route-specific trunk reservation in order to take into consideration the progressive traffic loading condition of a total alternate route at the rate of the route update interval (decentralized high-load-specific fixed or adaptive two-link route reservation).

In reality, the number of idle trunks of a link stored in the local trunk status map according to FIG. 2 is not already reduced by a certain number of trunks. Instead, the said artificial reduction is carried out by the routing process for the purpose of determining the alternate route sequence.

The BIAS-related trunk reservation can also be changed in near-real-time in dependence on the traffic loading on a link. To determine the near-real-time BIAS value, the estimated value of the real-time link-specific BIAS value BIAS(t) is formed over the prediction interval dT at the end of each prediction interval (approximately equal to the route update interval dT):

$$BIAS_i(t,dT)=dT\ (a_i(t,dT)-x_i(t)/t_m) \quad (1)$$

where $a_i(t,dT)$ is the call arrival rate, $x_i(t)$ is the number of trunks of a link i currently occupied at time t, $t_m$ is the mean call duration and $x_i(t)/t_m$ is the connection cleardown rate. These estimated BIAS values are themselves random variables. In particular, the call arrival rate itself must be obtained from the number of call arrivals $Z_i(dT)$ in the prediction interval dT by sliding averaging according to $$a_i(t,dT)=a_i(t-dT,dT)+(1-)\ Z_i(dT)/dT \quad (2)$$

where $0\leq\beta\leq 1$. For $\beta=0$ the result is, for example, almost instant-like but wide-ranging estimates whilst $\beta=1$ leads to $a_i(t,dT)=a_i\ (0,dT)$, that is to say updates the initial value.

The values $\beta=0.9$ and $t_m=180$ s are frequently used.

A purely mathematical formation of an expected value via equation (1) illustratively provides $$E(BIAS_i(t,dT))=\frac{dT}{t_m}\ (A_i(t)-y_i(t)) \quad (3)$$

where $A_i(t)$ is now the offered traffic and $y_i(t)$ is the loading on link i at time t. This formation of an expected value cannot be achieved in real time, i.e. for $dT<<t_m$ but can be used for estimating fixed BIAS guide values in experimental load situations. If, for example, the current mean trunk group loading y=80 Erl, the currently received mean offered load A=116 Erl and the ratio $dT/t_m=0.10$, the near-real-time BIAS value for the time interval from t to (t+dT) would have to be set to be equal to 3.6.

In active operation, the sliding updates of $a_i(t)$ and of the current status information $x_i(t)$ provide for a suitable BIAS adaptation which must be adjusted, for example by the parameters dT and $\beta$, in such a manner that the processing load remains limited at very high loads. Since the prediction error increases with increasing prediction interval dT, this must be selected to be as small as possible but greater than all possible round-trip delays in the signaling system if a cooperative importation of status information, which is still to be explained in greater detail in the text which follows, is used for completing the local trunk status map LTSM.

The information on the availability of an intermediate switching node Tn and the states of a secondary link L2 are imported via the signaling channels from the corresponding intermediate switching nodes after each route update interval and stored in the local trunk status maps. In the case of a communications network having N switching nodes, M additional secondary link status messages from (N−1) destination switching nodes, corresponding to the predetermined set of alternate routes, must be imported from each originating switching node in the route update interval dT=10 s and stored. With N=64, M=14 and 2 bytes per state of a link, the database for the secondary link will require the size of 28 bytes for each destination and thus a total size of 1.764K bytes per originating switching node for all destinations. For the message transfer on the central signaling channel, it can be assumed that the switching nodes still remain coupled via associated 64-kbit/s signaling channels. The aggregate bit rate for the importation into the or respectively the exportation from the local trunk status map, distributed over the route update interval, is therefore 2 DB×8/dT=2.822 kbit/s per switching node. However, the message exchange takes place in the MSU datagram mode. Each MSU (message signaling unit) of nominally about 272 bytes gross finds its destination within about 100 msec. For each MSU and destination, M×2 bytes=28 bytes must be transferred within dT or around 0.1 MSU/s. Furthermore, the originating switching node requests all intermediate switching nodes to signal back their load and destination trunk group statuses. For this, M bits are required for the information on the availability of the intermediate switching node.

The trunk group statuses of the secondary link sections can also be produced from the intermediate switching nodes as an alternative to the aforementioned retrieval method. For this purpose, M (N−1) 2 bytes are again required. There is virtually no change in the message size.

The cooperative transfer of the information from the local trunk status maps between the switching nodes of the non-hierarchical communications network results in a far-sighted routing method. The consequence of this, in turn, is that the much more critical and costly call processing will be relieved. At the same time, a load-dividing and dependability-relevant route processing interconnection with decentralized databases arises with little communication traffic. In a corresponding method with a central routing process, by comparison, N-times the database volume would have to be transmitted within dT to two dual computers operating dependability-relevantly with space diversity, which, in turn, would have to generate alternate route sequences with up to M alternate routes in the same time pattern from N (N−1), i.e. about $N^2$ link statuses and transfer these back into N decentralized table memories.

Instead of the cooperative transfer of the secondary link status information, stored in the local trunk status maps, between the switching nodes, a method for the intelligent learning of the statuses of the corresponding links and switching nodes can also be used. This method could be implemented, for example, in such a manner that the said statuses are updatingly estimated at greater time intervals by means of conditional blocking experience (successor links blocked under the condition primary links idle) and brought up to date. This variant could be considered, in particular, in the case of international connections having distinctly medium-term multi-hour traffic profiles and restricted exchange of status information between origin and destination switching nodes and more than two link sections between these switching nodes.

Figure 3:
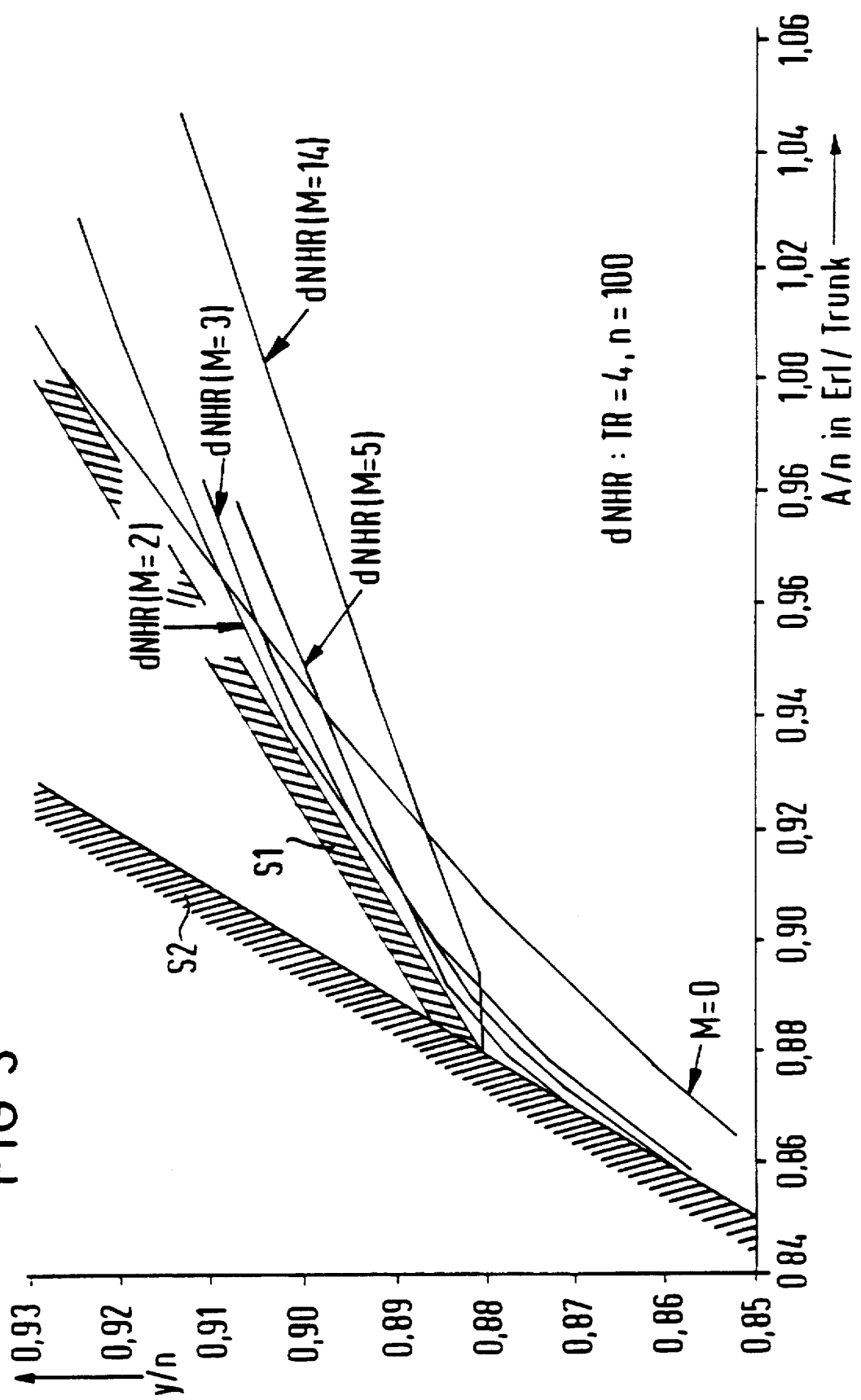
FIG. 3 illustrates the optimization of throughput in the case of adaptive route fan-out loading control.

FIG. 3 shows selected analytical case studies for symmetric and dynamic non-hierarchical routing (dNHR) in communications networks with sequential alternate overflow. The symmetry includes full intermeshing, n=100 trunks per link and equal offered traffic A/n in Erl per trunk and traffic pair but different alternate route fan-out sizes M as single remaining optimization parameter in the present symmetric case. As trunk reservation TR, the most suitable value for n, TR=4, is used and the BIAS values are neglected. The figure shows the successful traffic throughput, i.e. the normalized traffic loading y/n in Erlang per trunk as a function of the normalized offered traffic A/n in Erlang per trunk.

An almost loss-free throughput is achieved for M=14 up to an offered traffic of 0.88 Erl/trunk. Without trunk reservation TR, the knee would be formed by a sickle-shaped reduction in throughput. When the offered traffic is higher, however, the highest-possible throughput values are only achieved when the extent of the alternate-route fan-out, i.e. parameter M is reduced.

For A/n>1 Erl/trunk, finally, the uncontrolled communications network dominates with M=0 because otherwise, the traffic directed to the secondary link alternate routes would in each case impede the direct traffic of the corresponding links twice.

On the other hand, when M=0, all excessive incoming calls would not be given any further chances at success with less offered traffic in spite of existing capacity reserves of on average (n−A) per link, resulting in more blockages in percentage compared with an optimum route fan-out size M>0.

However, the state-controlled dynamic non-hierarchical routing (SDNHR) method according to the invention solves the said adaptation problem not only for symmetric networks but, at the same time, for asymmetric networks. As stated, alternate routes occupied to capacity are not used and, in addition, the alternate routes which have the highest near-real-time capacity reserves are occupied with priority. In addition, the risk of alternate-route over selections is countered by adaptive BIAS predictions in the route update interval. The throughput is here optimized again so that the end region shown by first shading S1 in FIG. 3 is approximated over all loads. This region, furthermore, approaches the ideal limit curve (y=A for A≦n or y=n for A≧n, indicated by a second shading S2 in FIG. 3) with increasing link capacities for n=100.

Figure 4:
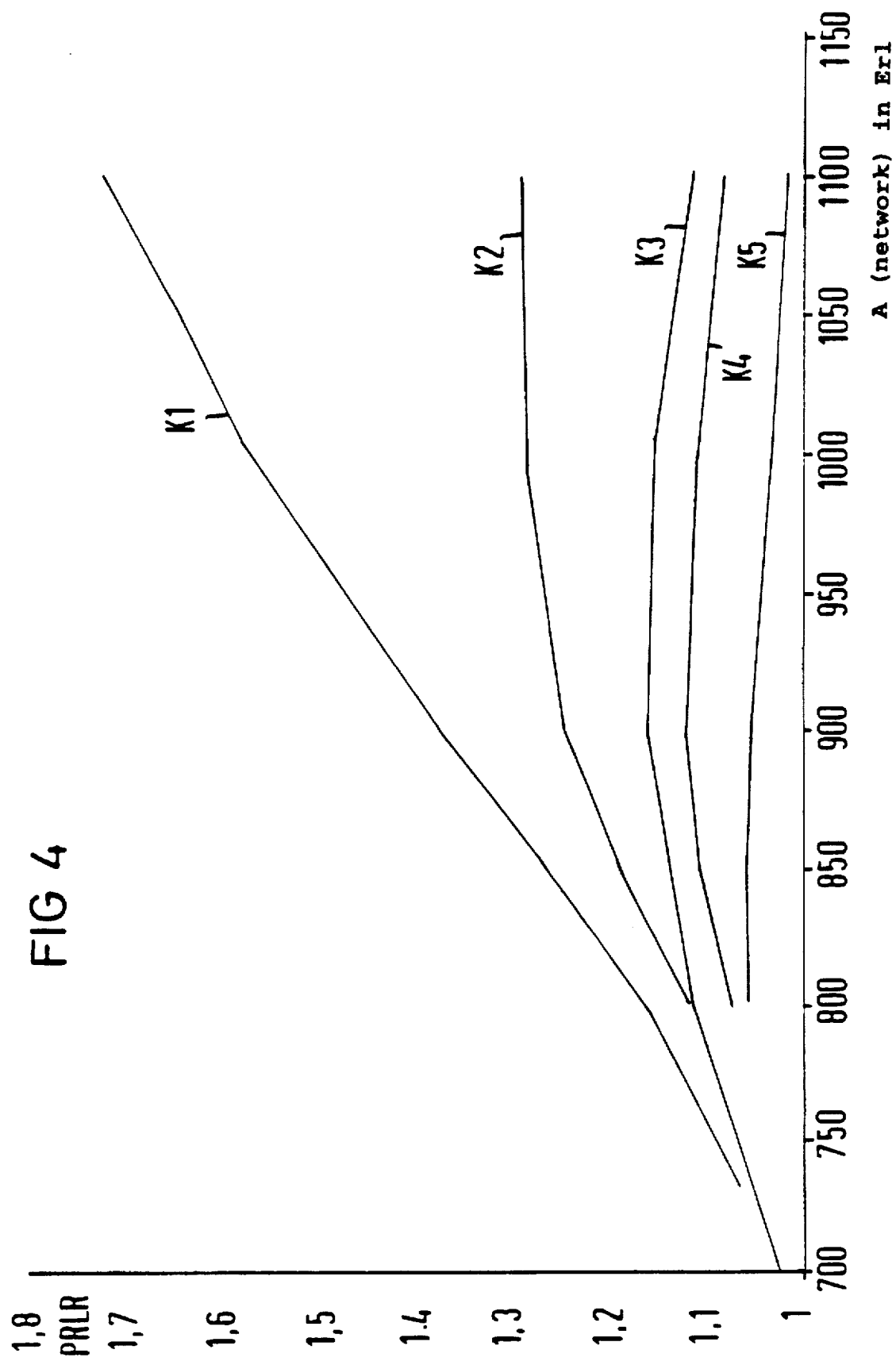
FIG. 4 shows the reduction in the processing load ratio (PRLR) in various embodiments of the method according to the invention.

FIG. 4 illustrates simulations on an asymmetric network with N=5 switching nodes and M=3, with respect to an expectable processing load ratio PRLR with offered traffic overloads A in Erlang Erl.

The processing load ratio PRLR here designates the mean call processing load per call due to sequential alternate-route overflows and crank-backs.

For planned or extreme loads, the processing load ratio tends towards 1 because virtually no traffic overflows occur or are permitted in these cases. Thus, only the planned route is tested per call in these cases.

A first curve K1 shows the PRLR characteristic of a sequential routing method without involving a local trunk status map, calculation and simulations corresponding to each other with negligibly small confidence intervals.

Significant reductions of the processing load ratio in accordance with a second curve K2 are obtained in the relevant high-load region when the locally existing status information of the primary links is used for updating the routing sequences (alternate-route sequences). This is because this ensures that the primary link (first section of an alternate route) is idle so that, if necessary, only the crank-back of the secondary link (second section of the alternate route) is included in the processing load ratio.

The BIAS term preselected according to a third curve K3 in the simulations reduces the error of estimation for the prediction interval dT (dT=10 s). This embodiment of the invention is particularly of interest for an extensive hardware implementation of the route processing method because this would not touch on the existing call processing.

If, in addition, the busy/idle states from the secondary links of the alternate routes are imported, the processing load ratio can be reduced further to exemplary maximum values of the magnitude of 1.06. This circumstance is illustrated by a fourth curve K4 and a fifth curve K5, the fourth curve having been determined without BIAS reservation and the fifth curve having been determined using a BIAS value of 5 as a basis. This embodiment of the invention is therefore particularly suitable for its extensive software implementation in existing hardware system environments.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for non-hierarchical routing of traffic in a communications network, comprising the steps of:

providing a number of interconnected switching nodes including at least one originating switching node and at least one destination switching node such that a number of connection paths exist between said originating switching node and said destination switching node, said originating switching node comprising a routing process, a routing table and a local trunk status map for determining an alternate route sequence, directing the traffic between said originating switching node and said destination switching node via at least one planned route, directing said traffic only via real time alternate routes between said originating switching node and said destination switching node in accordance with a real time alternate route sequence when a connection via said at least one planned route is not possible, periodically determining the real time alternative routes and the real time alternate route sequence, that represents a sequence of real time alternate routes ordered in accordance with momentary traffic load states, in substantially real time intervals, said real time alternate route sequence being determined in said originating switching node, and the real time alternate route sequence being determined from a predetermined set of real time alternate routes, such that an alternate route in the set of real time alternate routes, the traffic load state of which exceeds a certain threshold value, is excluded from the real time alternate route sequence.

2. The method according to claim 1, wherein each of said alternate routes has links for interconnecting said switching nodes and wherein the traffic load state of an alternate route is determined by means of a seizure state of an outgoing primary link of the alternate route from the originating switching node.

3. The method according to claim 1, wherein each of said alternate routes has links for interconnecting said switching nodes and wherein the traffic load state of an alternate route is determined by means of blocking successor links.

4. The method according to claim 1, wherein each of said alternate routes has links for interconnecting said switching nodes and wherein the traffic load state of an alternate route is determined by means of a seizure state of all links forming the alternate route and availability of intermediate switching nodes located on the alternate route.

5. The method according to claim 1, wherein each of said alternate routes has links for interconnecting said switching nodes and wherein a particular threshold value is modified with regards to a specific link and in substantially real time in dependence on a difference in number, averaged over a prediction interval, between call arrivals and call completions.

* * * * *